US006587105B1

(12) United States Patent
Stam

(10) Patent No.: US 6,587,105 B1
(45) Date of Patent: Jul. 1, 2003

(54) METHOD AND COMPUTER PROGRAM PRODUCT FOR SUBDIVISION GENERALIZING UNIFORM B-SPLINE SURFACES OF ARBITRARY DEGREE

(75) Inventor: Jos Stam, Seattle, WA (US)

(73) Assignee: Silicon Graphics, Inc., Mountain View, CA (US)

( * ) Notice: Subject to any disclaimer, the term of this patent is extended or adjusted under 35 U.S.C. 154(b) by 229 days.

(21) Appl. No.: 09/672,037

(22) Filed: Sep. 29, 2000

(51) Int. Cl.$^7$ ............................................. G06T 17/20
(52) U.S. Cl. ..................................................... 345/423
(58) Field of Search ............................ 345/423, 421, 345/420, 687, 419, 589, 582

(56) References Cited

U.S. PATENT DOCUMENTS

| | | | | | |
|---|---|---|---|---|---|
| 5,936,633 | A | * | 8/1999 | Aono et al. ................. | 345/589 |
| 6,037,949 | A | * | 3/2000 | DeRose et al. ............. | 345/582 |
| 6,271,861 | B1 | * | 8/2001 | Sargent et al. ............. | 345/589 |
| 6,285,372 | B1 | * | 9/2001 | Cowsar et al. ............. | 345/425 |
| 6,300,960 | B1 | * | 10/2001 | DeRose et al. ............. | 345/474 |
| 6,307,555 | B1 | * | 10/2001 | Lee ............................. | 345/423 |
| 6,222,553 | B1 | * | 4/2002 | DeRose et al. ............. | 345/423 |

OTHER PUBLICATIONS

Charles Teorell Loop, "Smooth Subdivision Surfaces Based on Triangles," Copyright Charles Teorell Loop, Master of Science Thesis, Department of Mathematics, The University of Utah, Aug. 1987.

Leif Kobbelt, "A Variational Approach to Subdivision," Computer Aided Geometric Design, Elsevier Science B.V., 1996, vol. 13, pp. 743–761.

Charles K. Chui, "Multivariate Splines," CBMS–NSF Regional Conference Series in Applied Mathematics, Society for Industrial and Applied Mathematics, 1988, pp. 1–189.

Denis N. Zorin, "Subdivision and Multiresolution Surface Representations," PhD Thesis, California Institute of Technology, Pasadena, California, 1998.

Ulrich Reif, "A Degree Estimate for Subdivision Surfaces of Higher Regularity," Proceedings of the American Mathematical Society, American Mathematical Society, vol. 124, No. 7, Jul. 1996, pp. 2167–2174.

Jos Stam, "Exact Evaluation of Catmull–Clark Subdivision Surfaces At Arbitrary Parameter Values," In Computer Graphics Proceedings, Annual Conference Series, Jul. 1998, pp. 395–404.

(List continued on next page.)

Primary Examiner—Mark Zimmerman
Assistant Examiner—Huedung X. Cao
(74) Attorney, Agent, or Firm—Sterne, Kessler, Goldstein & Fox P.L.L.C.

(57) ABSTRACT

A method and computer program product are presented for converting an arbitrary mesh to a subdivision surface. Where the subdivision surface is to have an odd degree d=2m+1 on the regular part of the mesh, the method includes the steps of subdividing the mesh in a linear fashion, then iteratively smoothing the subdivided mesh m times. Where the subdivision surface is to have an even degree d=2m on the regular part of the mesh, the method includes the steps of subdividing the mesh, calculating the dual of the subdivided mesh, and iteratively smoothing the dual m−1 times. In either case, the resulting subdivision surfaces generalize uniform tensor product B-spline surfaces of any degree to meshes of arbitrary topology. The method uses subdivision rules that involve direct neighbors.

17 Claims, 14 Drawing Sheets

OTHER PUBLICATIONS

Henrik Weimer and Joe Warren, "Subdivision Schemes for Thin Plate Splines," Proceedings of Eurographics 1998, The Eurographics Association and Blackwell Publishers, vol. 17, No. 3, pp. 303–313.

E Catmull and J Clark, "Recursively Generated B–Spline Surfaces on Arbitrary Topological Meshes," Computer Aided Design, IPC Business Press, vol. 10, No. 6, Nov. 1978, pp. 350–355.

Ulrich Reif, "A Unified Approach To Subdivision Algorithms Near Extraordinary Vertices," Computer Aided Geometric Design, Elsevier Science B.V., 1995, pp. 153–174.

Jorg Peters and Ulrich Reif, "Analysis of Algorithms Generalizing B–Spline Subdivision," Society for Industrial and Applied Mathematics, SIAM Journal of Numerical Analysis, vol. 35, No. 2, Apr. 1998, pp. 728–748.

D Doo and M Sabin, "Behaviour of Recursive Division Surfaces Near Extraordinary Points," Computer Aided Design, IPC Business Press, vol. 10, No. 6, Nov. 1978, pp. 356–360.

Jeffrey M. Lane and Richard F. Riesenfeld, "A Theoretical Development for the Computer Generation and Display of Piecewise Polynomial Surfaces," IEEE Transactions on Pattern Analysis and Machine Intelligence, vol. PAM I–2, No. 1, Jan. 1980, pp. 35–46.

Hoppe, Hugues et al., "Piecewise Smooth Surface Reconstruction," In Computer Graphics Proceedings, Annual Conference Series, Jul. 1994, pp. 295–302.

* cited by examiner

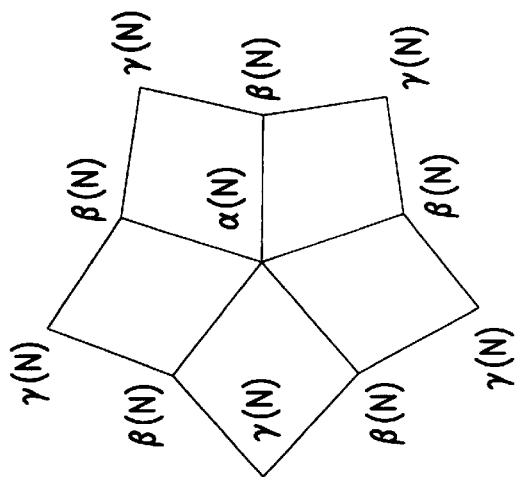
FIG. 10C
FIG. 10B
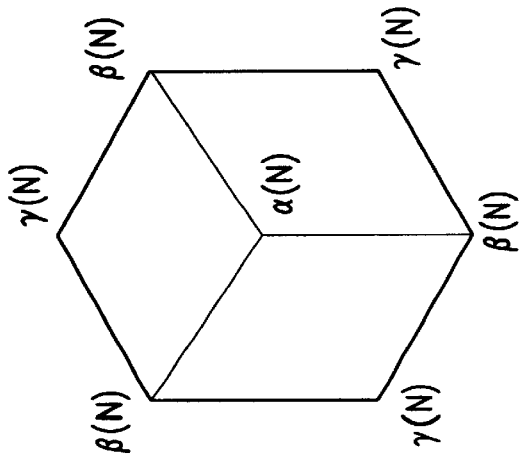
FIG. 10A

METHOD AND COMPUTER PROGRAM PRODUCT FOR SUBDIVISION GENERALIZING UNIFORM B-SPLINE SURFACES OF ARBITRARY DEGREE

BACKGROUND OF THE INVENTION

1. Field of the Invention

The invention described herein relates to computer graphics, and more particularly to modeling and manipulation of three dimensional surfaces.

2. Related Art

Currently, subdivision surfaces are not widely used in surface design, especially in the high-end design market, such as the automotive industry where surfaces of degree 5 and 7 are frequently used in the modeling of body panels. Such surfaces are important because they give designers enough degrees of freedom to directly control reflection lines in the panels. The main problem these designers currently face is in the manipulation of regions of irregular topology. For example, corners are typically handled by trimming three non-uniform rational B-spline (NURBS) surfaces of high degree. Trimming is a time-consuming process that yields only approximate continuity. Indeed, at the trim the surface may not even be $C^0$ continuous. Consequently, designers are forced to fine-tune many arcane parameters for the best fit.

Generalizations for uniform B-spline surfaces of degrees two and three were published in 1978 simultaneously by Catmull and Clark (Catmull, E., and Clark, J., *Computer Aided Design* 10:350–355 (1978)) and by Doo and Sabin (Doo, D., and Sabin, M. A., *Computer Aided Design* 10:356–360(1978)). Since then, it seems no attempt has been successful in extending this work to surfaces of higher degrees. This is partly due to the belief that such methods require large subdivision masks and, consequently, would be difficult to implement. Lower-degree surfaces are sufficient for character animation and free-form modeling, which have up to now been the primary applications of subdivision surfaces in industry.

What is needed, therefore, is a method for generalizing uniform B-spline surfaces of higher degree. A method for doing so must create surfaces that are naturally curvature-continuous at as many points as possible, minimizing the number of points where the curvature generally diverges. This would minimize the need for trimming. Note that by using the higher-degree surfaces, the rate of divergence can be reduced. Moreover, such a method should be easy to implement and should not require large subdivision masks.

SUMMARY OF THE INVENTION

The invention described herein is a method and computer program product for converting an arbitrary mesh to a subdivision surface. Where the subdivision surface is to have an odd degree d=2m+1 on the regular part of the mesh, the method includes the steps of subdividing the mesh in a linear fashion, then iteratively smoothing the subdivided mesh m times. Where the subdivision surface is to have an even degree d=2m on the regular part of the mesh, the method includes the steps of subdividing the mesh, calculating the dual of the subdivided mesh, and iteratively smoothing the dual m−1 times. In either case, the resulting subdivision surfaces generalize uniform tensor product B-spline surfaces of any degree to meshes of arbitrary topology. The method uses subdivision rules that involve direct neighbors, and is computationally efficient.

Although these generalizations are not $C^2$ everywhere, they provide useful alternatives to the current practice in the high end design market. The method offers $C^{d-1}$ continuity everywhere except at the irregular points where they are $C^1$. This continuity compares favorably with trimmed NURBS, which are often not even $C^0$. While the curvature, in general, diverges at the irregular points, it does so very slowly.

The foregoing and other features and advantages of the invention will be apparent from the following, more particular description of a preferred embodiment of the invention, as illustrated in the accompanying drawings.

BRIEF DESCRIPTION OF THE FIGURES

FIGS. 10A, 10B, and 10C illustrates subdivision masks that can be used in the odd degree subdivision method of FIG. 9, according to an embodiment of the invention.

DETAILED DESCRIPTION OF THE PREFERRED EMBODIMENTS

Figure 1:
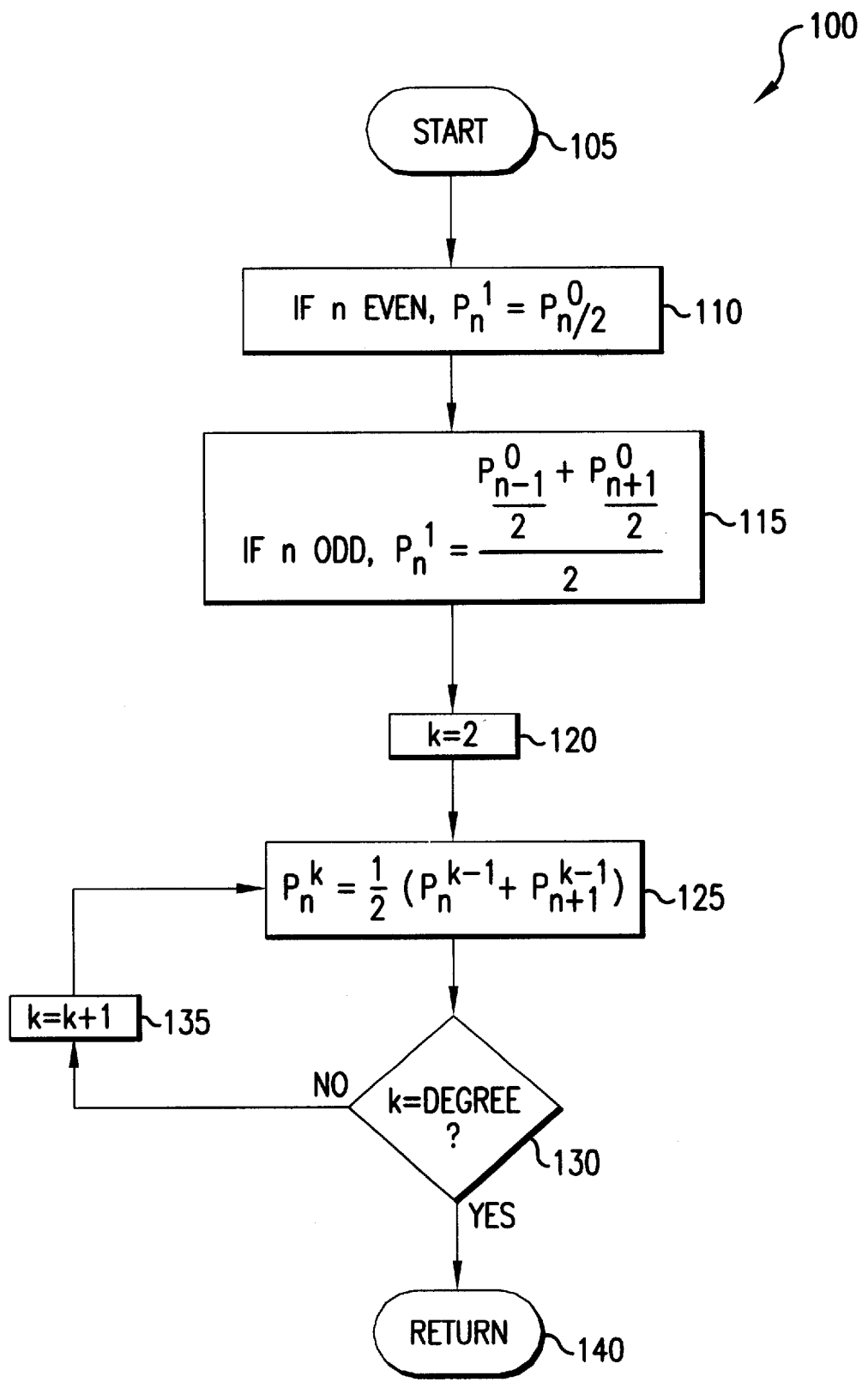
FIG. 1 is a flowchart illustrating a process for linear subdivision and smoothing of a B-spline curve.

A preferred embodiment of the present invention is now described with reference to the figures where like reference numbers indicate identical or functionally similar elements.

Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Introduction

The invention described herein provides for a new class of subdivision surfaces which generalize uniform tensor product B-spline surfaces of any degree to meshes of arbitrary topology. The subdivision rules for uniform B-spline surfaces of any degree can be generalized to meshes of arbitrary topology by updating topological elements (i.e., edges and vertices) which involve the direct neighbors of these elements. Consequently, the embodiments described below are practical to implement, regardless of degree. The invention involves generalization of the recurrence that computes binominal coefficients, viz. the Pascal Triangle. This fact was first observed by Lane and Riesenfeld in the curve context (Lane, J. M., and Riesenfeld, R. F., *IEEE Transactions on Pattern Analysis and Machine Intelligence* 2:35–46 (1980)).

The discussion of the invention is organized as follows. In the next section the subdivision for uniform B-spline curves and a recursive method to compute them is described. These results are then applied to tensor-product B-spline surfaces of any degree. Several example generalizations of these rules to meshes of arbitrary topology are then presented.

II. The Curve Case

The subdivision rules for uniform B-spline curves of any degree are well known in the art and are related to the binomial coefficients. Lane and Riesenfeld first showed how to subdivide efficiently using only local averages. This result is proven elegantly using the discrete Fourier transform as shown in Chui's monograph, for example (Chui, C. K., *Multivariate Splines*, CBMS-NSF Regional Conference Series in Applied Mathematics, SIAM, Philadelphia, Pa. (1988)). Lane and Riesenfeld provide an method for doubling the number of control vertices for a given B-spline curve. The method subdivides a set of initial control vertices $$\ldots, P_{-2}^0, P_{-1}^0, P_0^0, P_1^0, P_2^0, \ldots$$

of a degree d uniform B-spline curve in d steps. The method is iterative. The superscripts of the points P above refer to the iteration; each subscript refers to the position of the vertex on the curve. This method is illustrated in flowchart 100 of FIG. 1. The process starts at a step 105. The set of control vertices is linearly subdivided. This linear subdivision can be summarized as follows:

$$P_n^1 = \begin{cases} P_{n/2}^0 & n \text{ even} \\ (P_{(n-1)/2}^0 + P_{(n+1)/2}^0)/2 & n \text{ odd} \end{cases} \quad (1)$$

Therefore, for vertices in even numbered positions, i.e., when n is even, the vertex is replaced as shown in step 110. For vertices in odd numbered positions, the vertex is replaced as shown in step 115. Subsequently, in steps 125 through 135, new control vertices are generated using d−1 averaging steps. In step 120, an index k is initialized to 2. In step 125, each vertex is transformed as follows:

$$P_n^k = \frac{1}{2}(P_n^{k-1} + P_{n+1}^{k-1}) \quad (2)$$

In step 130, a determination is made as to whether the index k is equal to the degree of the curve. If not, then in step 135 k is incremented by one, and the process continues to another iteration of step 125. Step 125 is repeated until k equals d, the degree of the curve, at which point the process concludes with step 140.

Figure 2B:
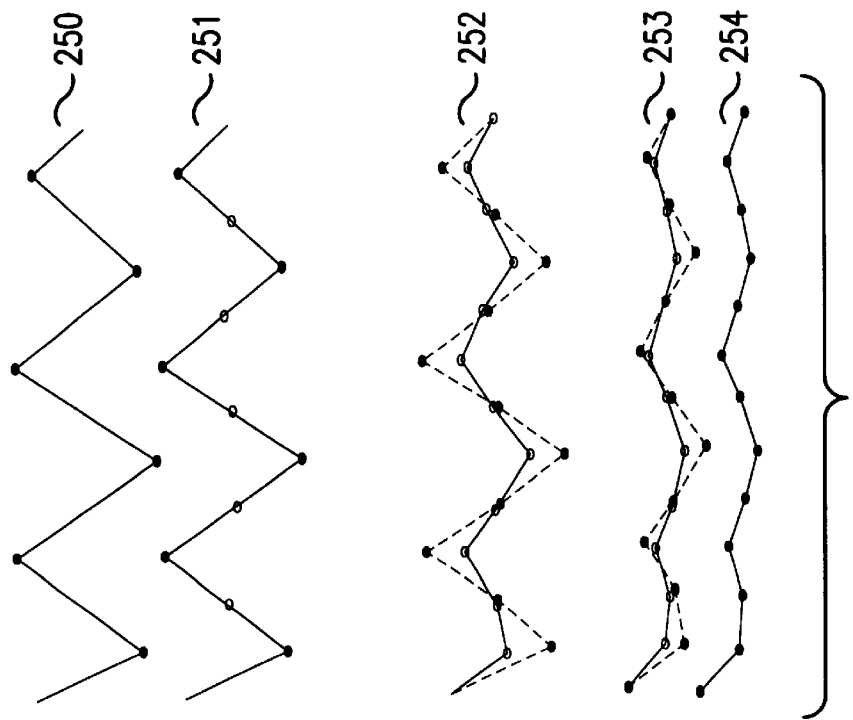
FIGS. 2A and 2B illustrate the results of applying subdivision methods to a B-spline curve.
Figure 2A:
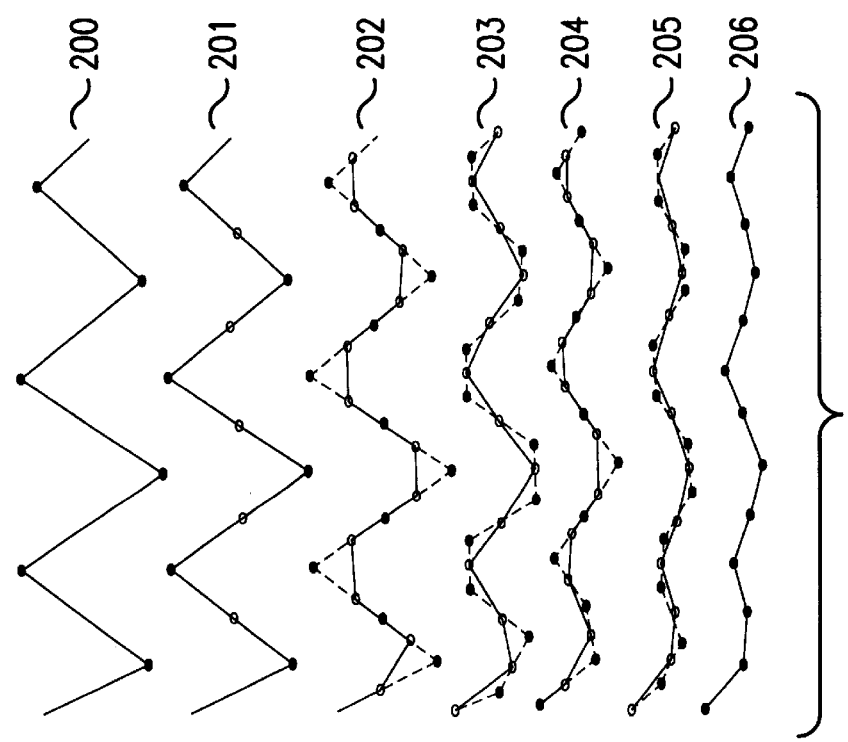

FIG. 2A provides a visual depiction of this method. The first graph 200 represents the initial state of the graph. Notice that after the first step 115, the number of vertices is doubled, as seen in graph 201. Hollow points represent vertices that are new for a given step. In each of the averaging steps 125, the number of vertices remains the same, as seen in graphs 202 to 206. Each averaging step raises by one the degree for which the original and new control vertices produce the same curve.

Two modifications can be made to this method. These modifications result in methods that are formally equivalent to the above method. These modified methods are mentioned here because their generalizations to meshes are easier to implement and can handle boundaries and creases more gracefully. As is evident from FIG. 2A, the vertices before and after an averaging step are staggered, while the control vertices before and after two averaging steps are "in place." For reasons of computational simplicity, the latter is more desirable when implementing this method. Therefore, an method equivalent to the Lane-Riesenfeld method is described here, wherein the vertices are left in place by performing two averaging steps at a time.

Figure 3:
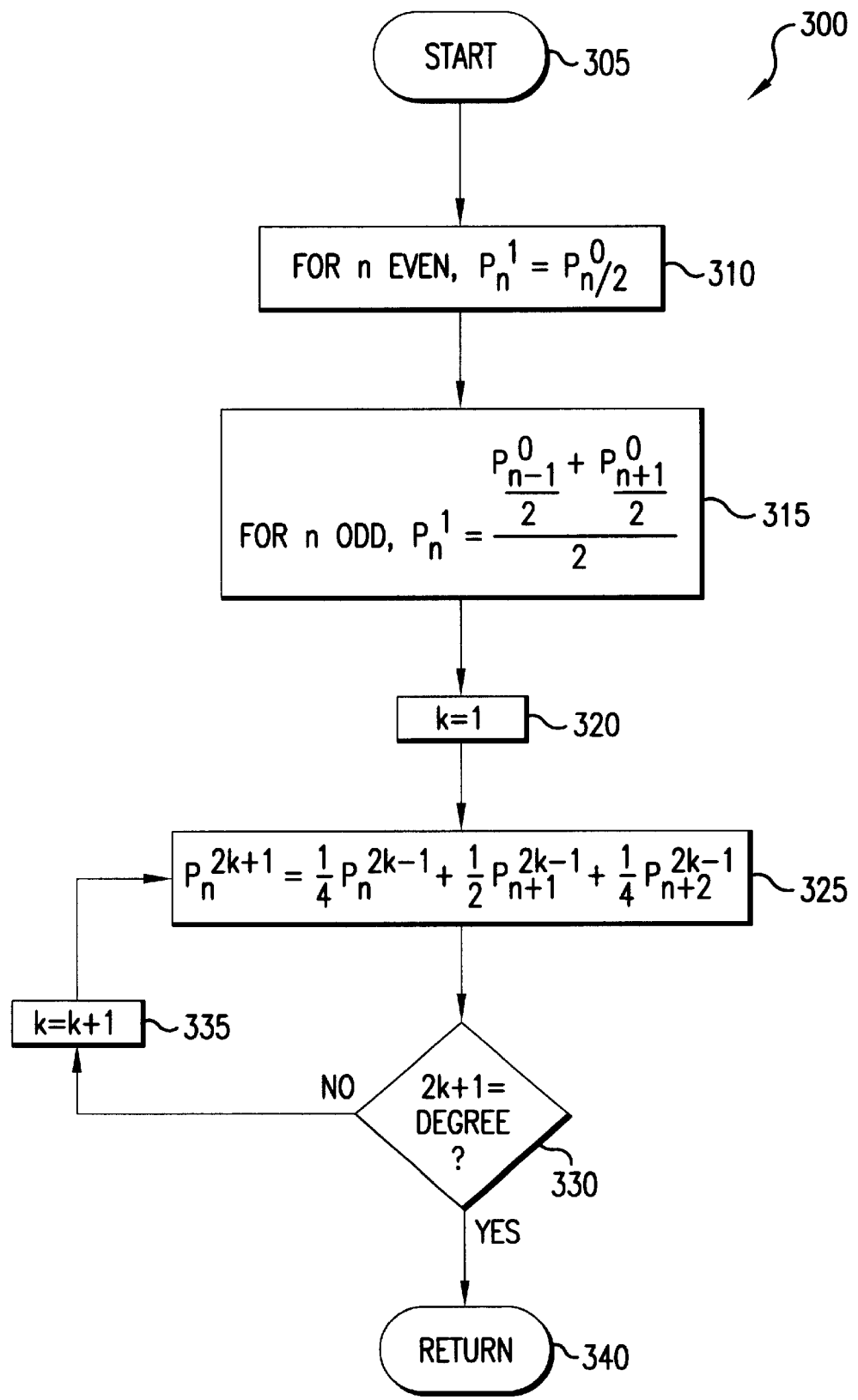
FIG. 3 is a flowchart illustrating a computationally efficient process for linear subdivision and smoothing of an odd degree B-spline curve.

An method for uniform B-splines of odd degree d=2m+1 is obtained by performing one linear subdivision step followed by m "smoothing steps." This is illustrated by FIG. 3, method 300. The method begins at step 305. In steps 310 and 315, one of two linear subdivision steps are performed on each vertex, depending on whether the vertex is in an even numbered position or an odd-numbered position. These two steps are the same as steps 110 and 115 described above (i.e., equation (1)). In step 320, index k is initialized to 1. In step 325, the following calculation is performed:

$$P_n^{2k+1} = \frac{1}{4}P_n^{2k-1} + \frac{1}{2}P_{n+1}^{2k-1} + \frac{1}{4}P_{n+2}^{2k-1}. \quad (3)$$

In step 330, a determination is made as to whether the expression 2k+1 is equal to the degree of the curve. If not, then k is incremented by one in step 335. Step 325 is then repeated with the new k. Each smoothing step 325 effectively elevates the degree by two. When step 325 has been completed and 2k+1 is equal to the degree, then the process concludes at step 340.

The result of the method is depicted in FIG. 2B. The first graph 250 represents the initial state. Graph 251 shows the result of the linear subdivision of steps 310 and 315. Graphs 252 through 254 show the results of the smoothing step (325).

Figure 4:
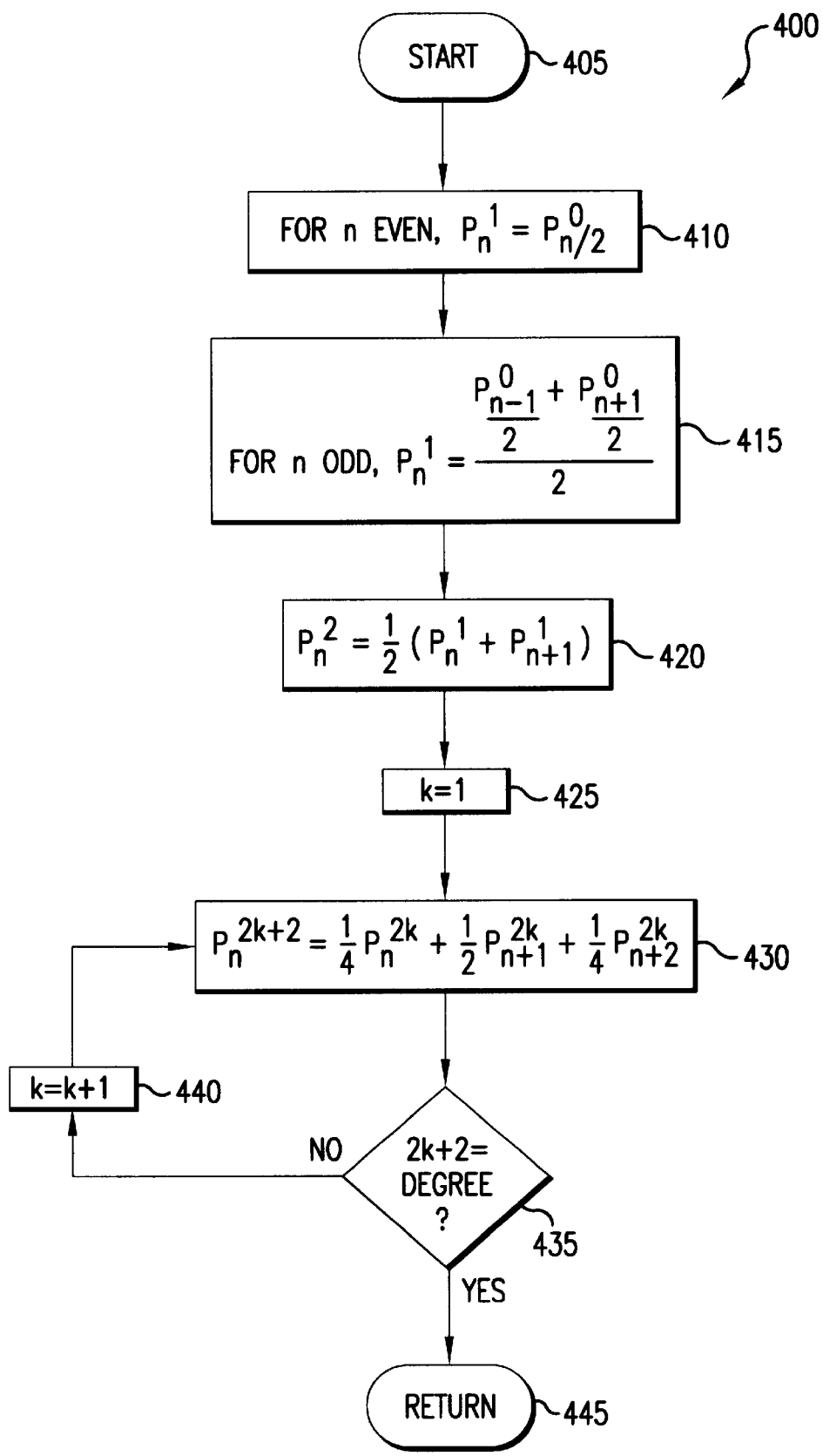
FIG. 4 is a flowchart illustrating a computationally efficient process for linear subdivision and smoothing of an even degree B-spline curve.

A similar method which keeps the vertices in place can be designed for uniform B-splines of even degree d=2m+2, as shown in FIG. 4. The process begins with step 405. In steps 410 and 415, one of two linear subdivision steps are performed on each vertex, depending on whether the vertex is in an even-numbered position or an odd-numbered position. In step 420, an averaging step is performed, as in step 125 of FIG. 1 (i.e., equation (2)). In step 425, index k is initialized to one. In-step 430, a smoothing step is performed, as in step 325 of FIG. 3, but with 2k+1 and 2k−1 replaced by 2k+2 and 2k, respectively. In step 435, a determination is made as to whether the expression 2k+2 is equal to the degree of the curve. If not, then k is incremented by one in step 440. Step 430 is then repeated with the new k. Each iteration of smoothing step 430 effectively elevates the degree by two. When step 430 has been completed and 2k+2 is equal to the degree, then the process concludes at step 445.

III. The Surface Case

This section addresses surface subdivision methods. The input to such a method is an arbitrary (manifold) mesh MO. A mesh can be defined by three arrays that store the vertices, edges and faces. Each vertex contains its position as well as the indices of the neighboring edges and faces. Each edge contains the indices of its end points and the indices of the two adjacent faces. Similarly, each face contains the indices of its neighboring faces, edges and vertices.

A valence is assigned to each vertex, equal to the number of edges emanating from the vertex. A vertex is called regular if it has valence four; otherwise, it is called extraordinary. The degree of the B-spline surface to be generalized is denoted by d in this section.

A. The Fundamental Method

Figure 5:
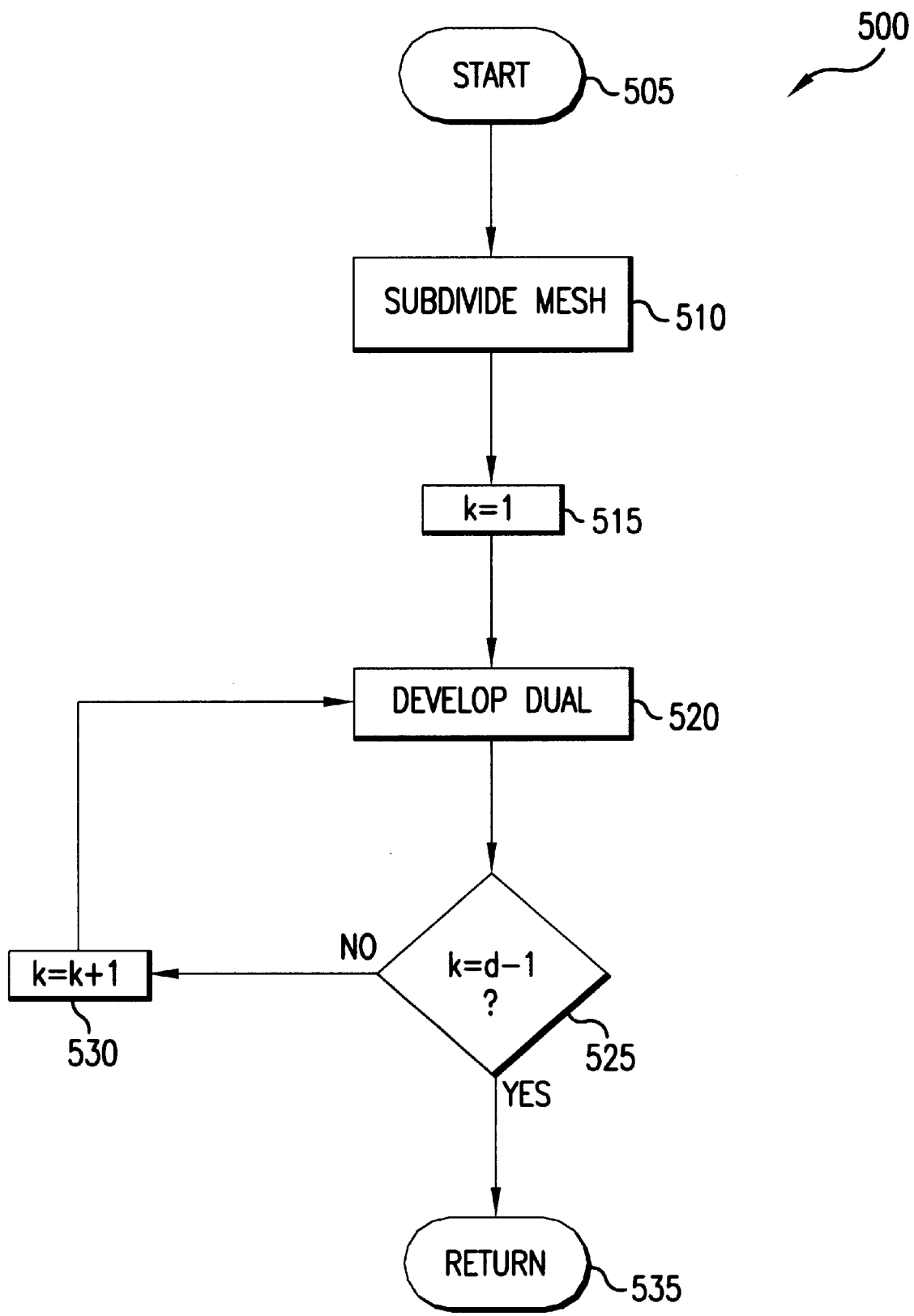
FIG. 5 is a flowchart illustrating a process for generalizing uniform B-spline surfaces, according to an embodiment of the invention.

The method in its fundamental embodiment involves generalization of the Lane-Riesenfeld method, and represents an iterative processing of the initial input mesh M0. This is illustrated in FIG. 5, process 500. The process begins with step 505. In step 510, input mesh MO is linearly subdivided. This step will be described in greater detail below. In step 515, an index k is initialized to one. In step 520, the dual of the mesh is developed; this step represents a smoothing or "averaging" of the mesh, and is described in greater detail below. In step 525, a determination is made as to whether k is equal to d−1. If not, then k is incremented by one in step 530. Step 520 is then repeated, so that the mesh is averaged once again. The process continues until k is equal to d−1, as determined in step 525. The process concludes at step 535.

In summary, the process of FIG. 5 involves d−1 averaging steps applied to the linearly subdivided mesh M1. The corresponding pseudocode reads as follows:

Fundamental (M0, d)
M1=LinSubdivide (M0)
for k=1 to d−1 do
　M1=Dual.(M1)
end for
return M1.

Figure 6:
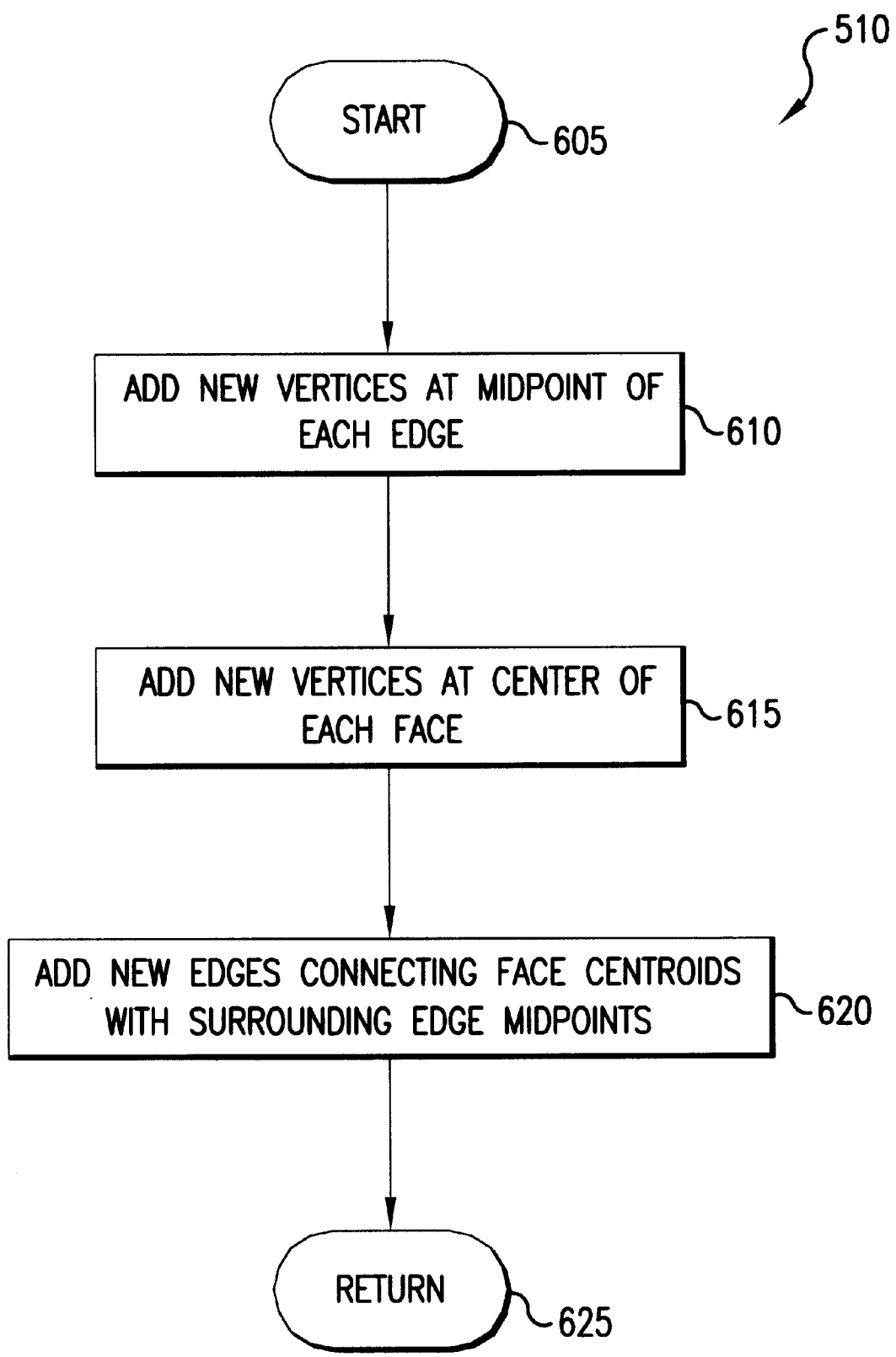
FIG. 6 is a flowchart illustrating a linear subdivision process for a three-dimensional mesh, according to an embodiment of the invention.

The above method starts by linearly subdividing the mesh M0:

M1=LineSubdivide (M0) in step 510. This step is illustrated in greater detail in FIG. 6, beginning with step 605. In this process the vertices of the original mesh M0 are unaffected. In step 610, new vertices are added at the midpoint of each edge. In step 615, new vertices are added at the centroid of each face. In step 620, edges are added connecting face centroids with each of the surrounding edge midpoints. This guarantees that the new mesh consists of quadrilateral faces. The linear subdivision process concludes at step 625.

Note that at this point, the subdivision method is a generalization of a uniform B-spline of degree one. Starting from this linearly subdivided mesh M1, there are different means of obtaining generalizations of uniform B-spline surface of arbitrary degree.

Figure 7:
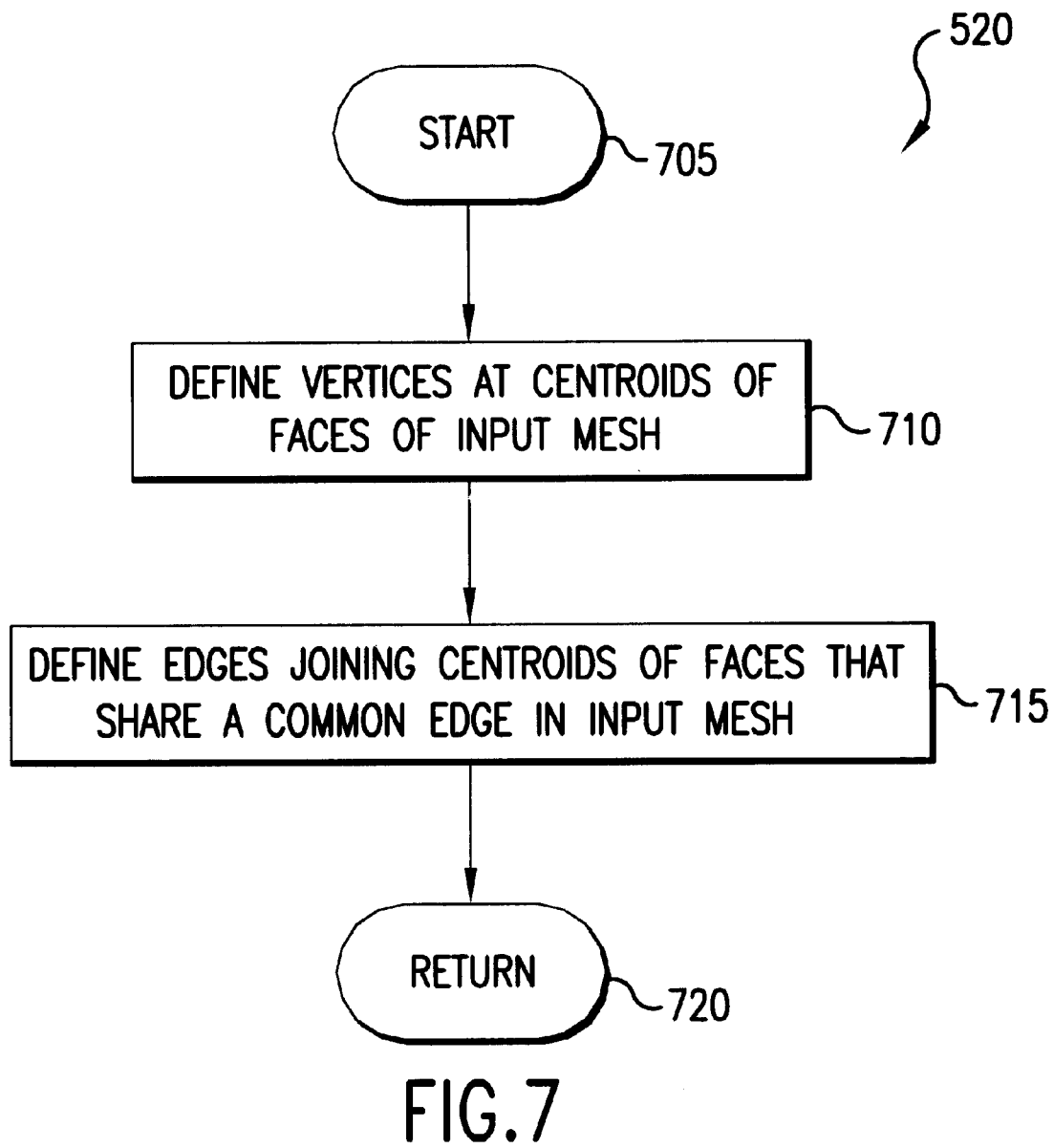
FIG. 7 is a flowchart illustrating development of a dual of a three-dimensional mesh, according to an embodiment of the invention.

The dual function generalizes the averaging step 125 of FIG. 1 (equation (2) above) to arbitrary meshes. The dual of mesh M1 is a new mesh created as described in FIG. 7. This process begins at step 705. In step 710, vertices are defined at the centroids of M1's faces. In step 715, edges are defined, joining centroids of faces that share a common edge in M1.

Figure 8:
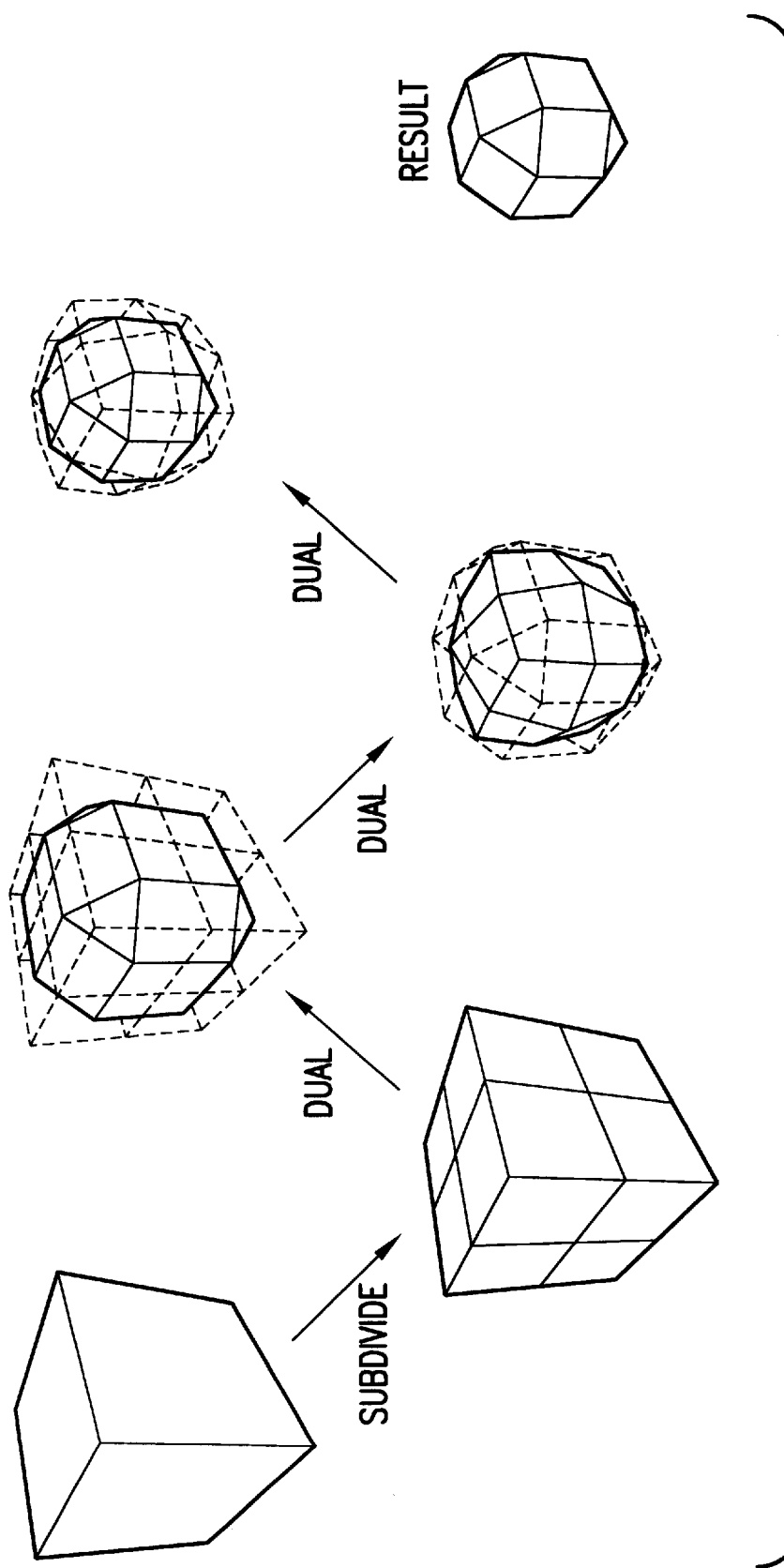
FIG. 8 illustrates the linear subdivision of a three-dimensional mesh and development of successive duals, according to an embodiment of the invention.

FIG. 8 illustrates exemplary application and results of process 500. The successive results of an initial linear subdivision step and several dual steps are shown. Clearly, each step requires only that the direct neighbors of vertices, edges and faces be found.

Although this method is conceptually straightforward, it can be inefficient because the dual routine modifies the topology of the mesh. For this reason, two other generalizations are presented next.

B. The Odd Degree Method

Figure 9:
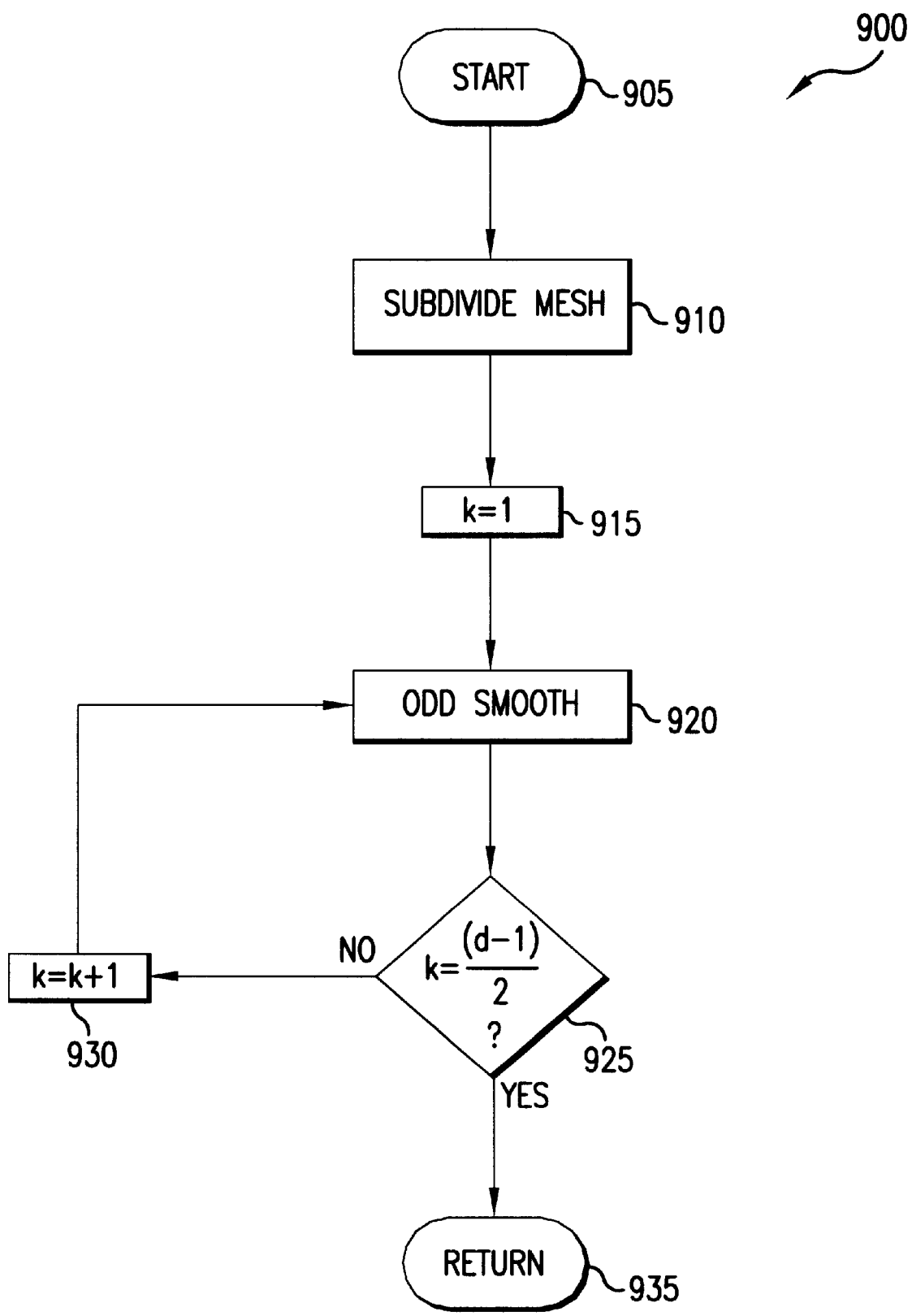
FIG. 9 is a flowchart illustrating a computationally efficient process for generalizing uniform B-spline surfaces of odd degree, according to an embodiment of the invention.

As suggested above, a more efficient subdivision method can be defined that generalizes uniform B-spline surfaces of odd degree. This method generalizes equation (3), the smoothing step 325 of FIG. 3. An embodiment of this process is illustrated as process 900 of FIG. 9. The process begins at step 905. In step 910, an initial mesh M0 is linearly subdivided. This is the same linear subdivision process illustrated in FIG. 6. In step 915, index k is initialized to one. In step 920, a vertex smoothing operation "OddSmooth" is performed, an operation specific to the case of an odd degree surface. This smoothing process is described in greater detail below. In step 925, a determination is made as to whether k is equal to (d−1)/2. If not, then k is incremented in step 930. Step 920 is then repeated. Step 920 reiterates with successively greater k, until k is equal to (d−1)/2 in step 925. When k reaches this value, the process concludes at step 935.

The process can be represented as the pseudocode below:
Odd(M0,d)
M1=LinSubdivide (M0)
for k=1 to (d−1)/2 do
　OddSmooth (M1)
end for
return M1.

The smoothing function OddSmooth (step 920) updates ("smoothes") the vertices of the mesh. The smoothing of a vertex v involves only the vertices of the faces adjacent to vertex v. For regular vertices, the smoothing mask is the tensor-product version of equation (3) (step 325), whose mask consists of 3×3=9 numbers, as shown in FIG. 10B. Hence the updated vertex v'$_r$ of a regular vertex v$_r$ is derived as follows:

$$v'_r = \frac{4}{16}v_r + \frac{2}{16}\sum (\text{midpoint vertices}) + \frac{1}{16}\sum (\text{corner vertices})$$

At an extraordinary vertex v$_e$, the mask is more complicated and includes v itself as well as N edge vertices and N face vertices, where N is the valence of v. α(N) denotes the coefficient associated with v. For reasons of symmetry, all the coefficients associated with v's edge vertices have to be equal; call them β(N). Similarly, all the coefficients for v's face vertices are equal; call them γ(N). Hence, the updated extraordinary vertex v'$_e$ of extraordinary vertex v$_e$ is derived as follows:

$$v'_e = \alpha v_e + \beta \Sigma(\text{edge vertices}) + \gamma \Sigma(\text{face vertices})$$

FIGS. 10A and 10C depict masks for irregular vertices of valences 3 and 5 respectively.

There are many possible choices for the values of the coefficients, but they should at least give rise to an affine invariant subdivision method:

$$\alpha(N)+N\beta(N)+N\gamma(N)=1$$

It is also desirable to have coefficients that are positive to ensure stability and to guarantee the convex hull property. One choice of parameters that has all the desired properties is as follows:

$$\alpha(N) = \frac{N-3}{N}, \quad \beta(N) = \frac{2}{N^2} \text{ and } \gamma(N) = \frac{1}{N^2}.$$

Note that existing implementations of the Catmull-Clark method can be modified to handle surfaces of arbitrary odd degree. Such a method involves a Catmull-Clark subdivision step with (d−3)/2 odd smoothing steps.

C. The Even Degree Method

Figure 11:
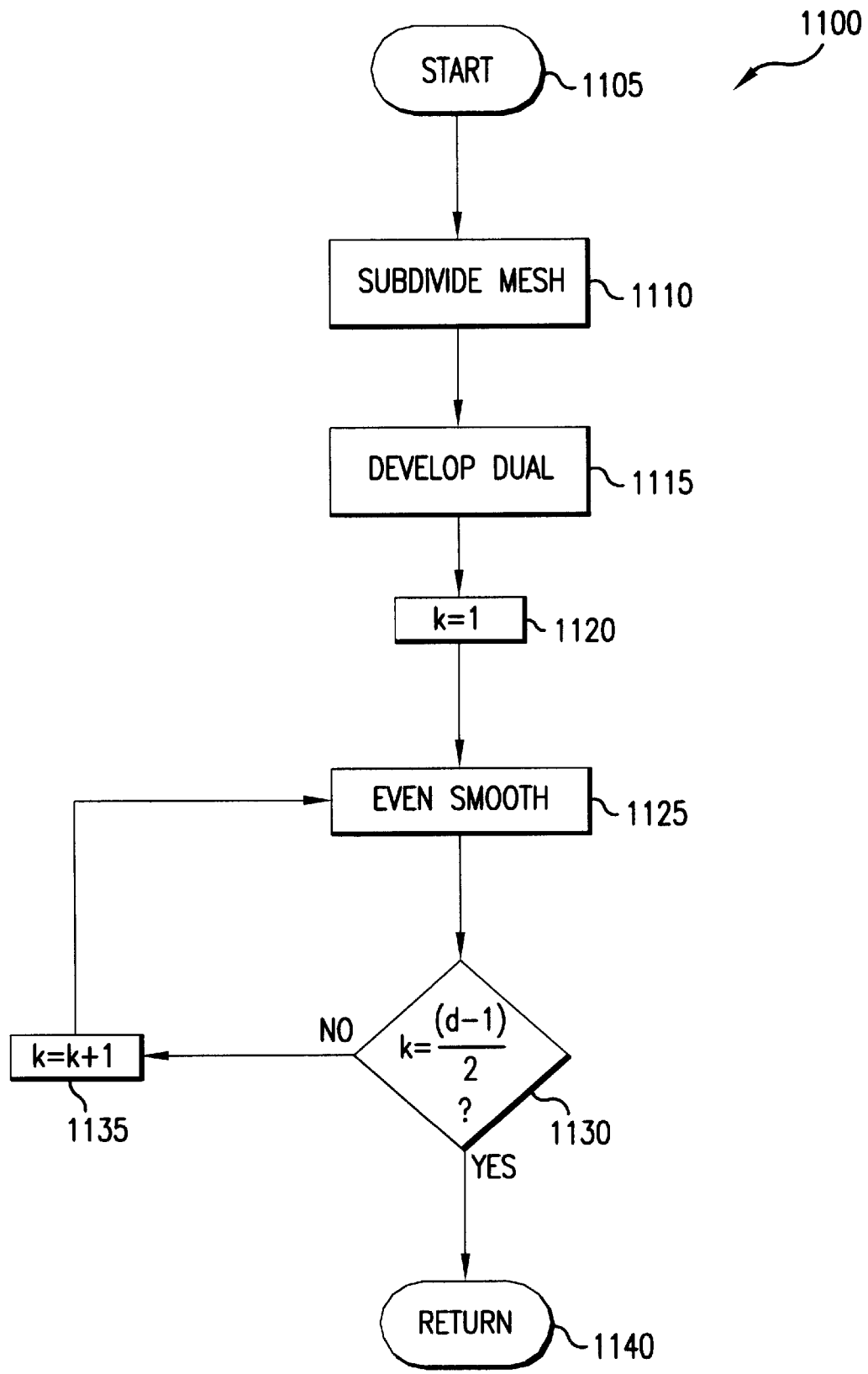
FIG. 11 is a flowchart illustrating a computationally efficient process for generalizing uniform B-spline surfaces of even degree, according to an embodiment of the invention.

To construct a method for even degrees, one averaging step (the Dual function) is applied to the linearly subdivided mesh first, followed by (d−2)/2 even smoothing steps. An embodiment of this is illustrated in FIG. 11, process 1100. The process begins at step 1105. In step 1110, an initial mesh M0 is linearly subdivided. This is the same linear subdivision process described above and illustrated in FIG. 6. In step 1115, the dual of the linearly subdivided mesh is developed. In step 1120, index k is initialized to one. In step 1125, a vertex smoothing operation "EvenSmooth" is performed, an operation specific to the case of an even degree surface. This smoothing process is described in greater detail below. In step 1130, a determination is made as to whether k is equal to (d−2)/2. If not, then k is incremented in step 1135. Step 1125 is then repeated. Step 1125 repeats with successively greater k, until k is equal to (d−2)/2 in step 1130. When k reaches this value, the process concludes at step 1140.

In pseudocode, the process can be represented as follows:

Even (M0, d)
  M1=LinSubdivide (M0)
  M1=Dual (M1)
  for k=1 to (d−2)/2 do
    EvenSmooth (M1)
  end for
  return M1.

Before smoothing, each vertex of the mesh is regular. Therefore, EvenSmooth can be defined as follows. Replace each vertex with the average of the centroids of the four adjacent faces. This operation is local and has the desired properties of affine invariance and positive coefficients. Process 1100 of FIG. 11 is more easily implemented and more efficient than process 500 of FIG. 5 because it does not replace M1 with a dual mesh whose topology differs in every smoothing step.

D. Boundaries, Corners and Creases

Sharp boundaries and creases can be incorporated in odd degree subdivision methods. For degree one surfaces, all edges are creased and all boundaries are sharp. Therefore, the first subdivision step is the same as the one called in the routine Odd (process 900). The smoothing step has to be modified. For vertices not on the boundary or on a crease, the same mask as in FIG. 10 can be applied. For a vertex on a crease or on a boundary, the curve smoothing mask defined by equation (3) can be used along the crease or the boundary. When more than two crease edges meet at a vertex, the vertex is a cusp or corner and no smoothing is performed.

Figure 12:
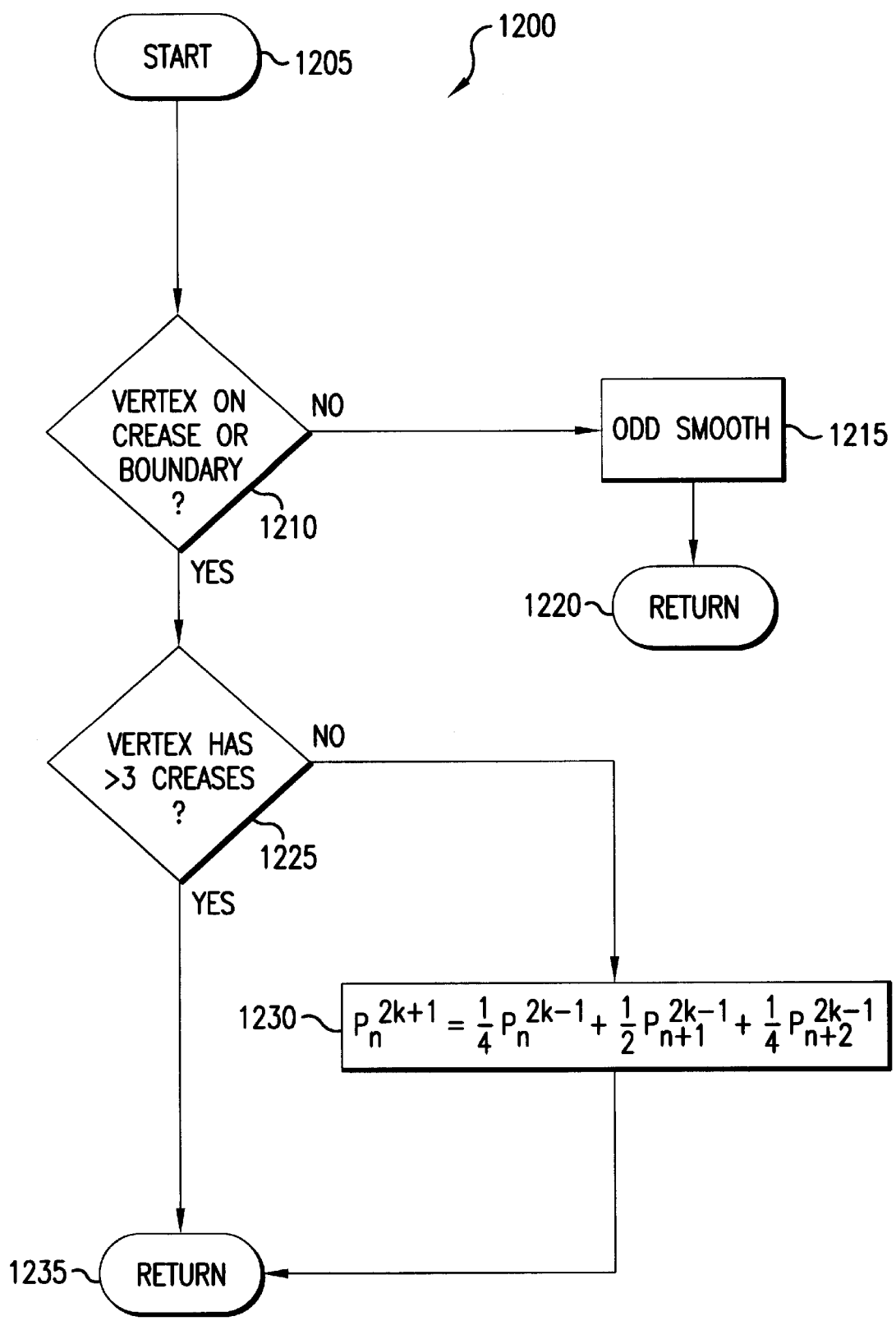
FIG. 12 is a flowchart illustrating a computationally efficient process for generalizing a uniform B-spline surface of odd degree where the surface has creases or boundaries, according to an embodiment of the invention.

This is illustrated in FIG. 12 as process 1200. The process starts at step 1205. In step 1210, a determination is made for each vertex as to whether the vertex is on a crease or boundary. If the vertex is on neither, then OddSmooth is performed on the vertex in step 1215. Processing for such a vertex ends with step 1220.

If, in step 1210, a vertex is determined to be on either a crease or boundary, then the process continues for such a vertex at step 1225. Here, a determination is made as to whether three or more creases are connected to the vertex. If so, the processing concludes at step 1235. Otherwise, the vertex is smoothed at step 1230 in the same manner as in equation 3 (i.e., step 325). Processing for such a vertex concludes at step 1235.

E. Triangular Methods

Figure 13A:
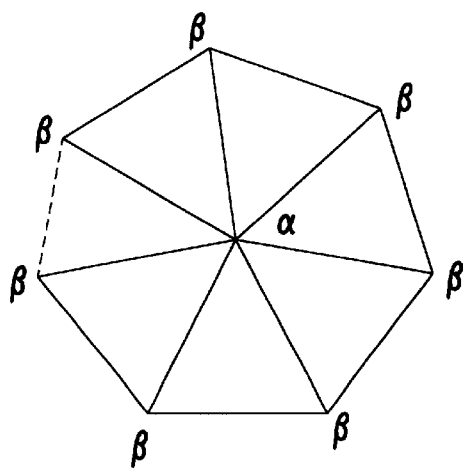
FIG. 13A illustrates a vertex subdivision mask for a triangular subdivision surface, according to an embodiment of the invention.
Figure 13B:
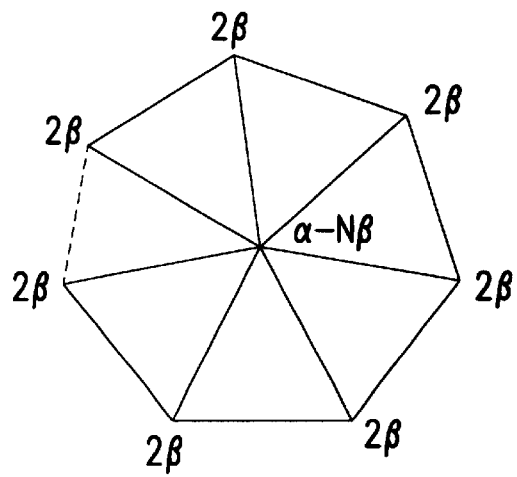
FIG. 13B illustrates a smoothing mask for a triangular subdivision surface, according to an embodiment of the invention.

The generalizations of uniform tensor-product B-splines can also be extended to handle triangular subdivision surfaces. A method generalizing the subdivision rules for triangular box spline surfaces of total degree 4 was first proposed by Loop in 1987 (Loop, C. T., Smooth Subdivision Surfaces Based on Triangles, M. S. thesis, Department of Mathematics, University of Utah, August 1987). Similarly, the subdivision masks for triangular box splines of higher degree can be related to lower degree ones. Generalizations of triangular box splines of total degree d=3m+1 can be constructed by an extension of the Odd process above. First, new vertices are added at the midpoint of each edge of the triangulation. Next, m smoothing steps of the vertices are performed. The smoothing mask involves direct neighbors and is related to the vertex subdivision mask of Loop's subdivision surfaces. Let $\alpha$ and $\beta$ be the coefficientsof the vertex mask as shown in FIG. 13A. Then the coefficients of the smoothing mask are given by $\alpha'=\alpha-N\beta$ and $\beta'=2\beta$, where N is the valence of the vertex, as seen in FIG. 13B. For a regular vertex we have $\alpha'=\frac{1}{4}$ and $\beta'=\frac{1}{8}$. Here there is no need to distinguish between vertex and edge rules. Generalizations to other degrees are possible; methods analogous to the Fundamental method above for B-splines are complex since the dual of a regular triangular mesh is hexagonal, whereas for regular B-spline meshes, the dual remains a quad mesh.

IV. Computing Environment

Figure 14:
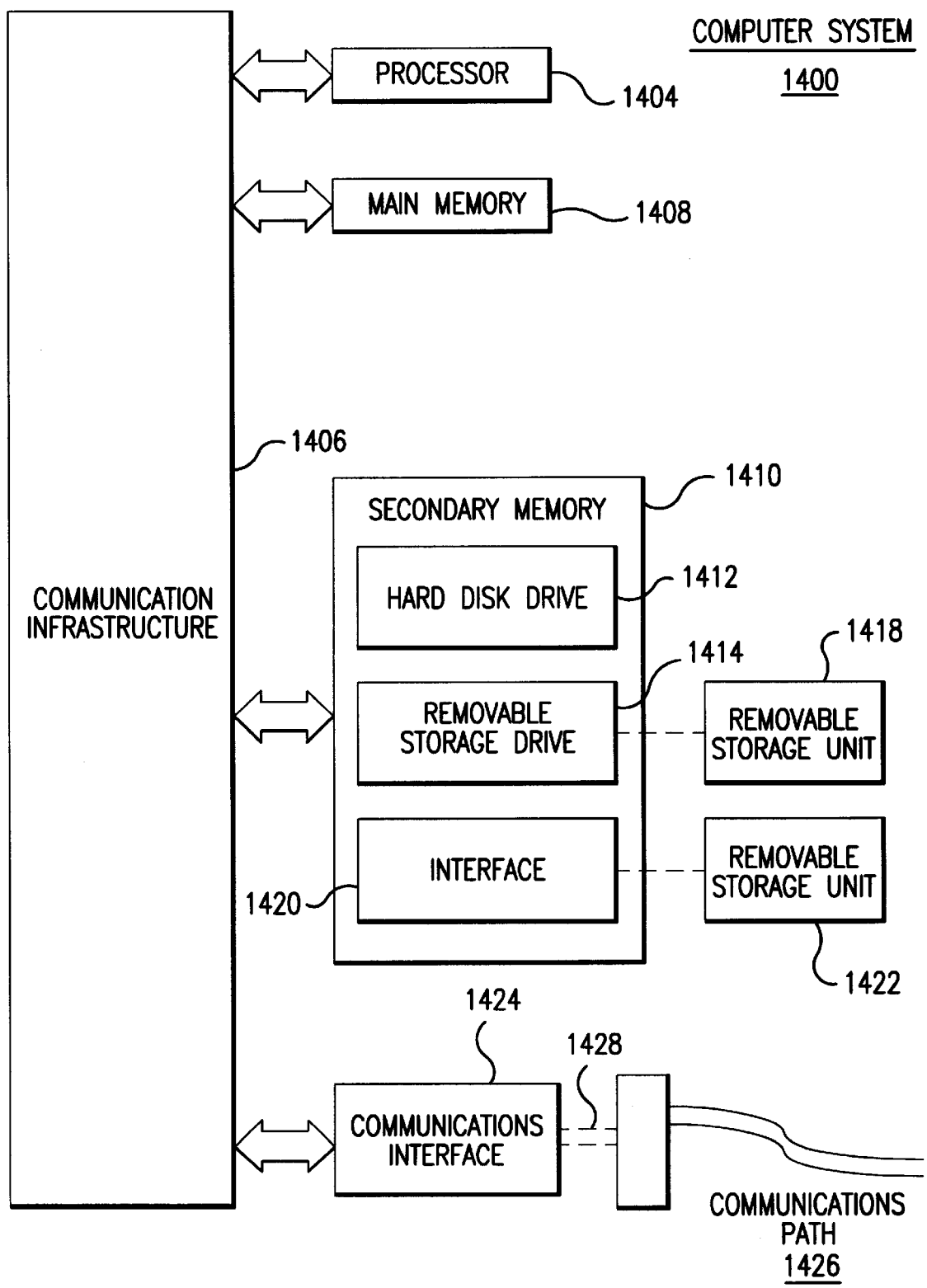
FIG. 14 illustrates an exemplary computing environment for an embodiment of the invention.

Components of the present invention may be implemented using hardware, software or a combination thereof and may be implemented in a computer system or other processing system. An example of such a computer system 1400 is shown in FIG. 14. The computer system 1400 includes one or more processors, such as processor 1404. The processor 1404 is connected to a communication infrastructure 1406, such as a bus or network. Various software implementations are described in terms of this exemplary computer system. After reading this description, it will become apparent to a person skilled in the relevant art how to implement the invention using other computer systems and/or computer architectures.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418, represents a floppy disk, magnetic tape, optical disk, or other storage medium which is read by and written to by removable storage drive 1414. As will be appreciated, the removable storage unit 1418 includes a computer usable storage medium having stored therein computer software and/or data;

In alternative implementations, secondary memory 1410 may include other means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a PCMCIA slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (i.e., channel) 1426. This channel 1426 carries signals 1428 and may be implemented using wire or cable, fiber optics, a phone line, a cellular phone link, an RF link and other communications channels. In an embodiment of the invention, signals 1428 include information representing an arbitrary three-dimensional mesh M0 that serves as input to one of the subdivision methods described above.

In this document, the terms "computer program medium" and "computer usable medium" are used to generally refer to media such as removable storage units 1418 and 1422, a hard disk installed in hard disk drive 1412, and signals 1428. These computer program products are means for providing software to computer system 1400.

Computer programs (also called computer control logic) are stored in main memory 1408 and/or secondary memory 1410. Computer programs may also be received via communications interface 1424. Such computer programs, when executed, enable the computer system 1400 to implement the present invention as discussed herein. In particular, the computer programs, when executed, enable the processor 1404 to implement the present invention. Accordingly, such computer programs represent controllers of the computer system 1400. Where the invention is implemented using software, the software may be stored in a computer program product and loaded into computer system 1400 using removable storage drive 1414, hard drive 1412 or communications interface 1424. In an embodiment of the present invention, logic for performing the subdivision methods described above is implemented in software and can therefore be made available to a processor 1404 through any of these means.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method for converting an arbitrary mesh to a subdivision surface having an odd degree d, the degree having the form d=2m+1, the method comprising the steps of:
   (a) subdividing the mesh; and
   (b) iteratively smoothing the subdivided mesh m times, whereby a model of the surface results.

2. The method of claim 1, wherein said step (a) comprises the steps of:
   (i) adding a vertex at a midpoint of each edge;
   (ii) adding a vertex at a centroid of each face; and
   (iii) adding edges that connect each centroid with the midpoints of the centroid's surrounding edges.

3. The method of claim 1, wherein an iteration of smoothing in step (b) comprises the steps of:
   (i) for a regular vertex $v_r$, calculating an updated vertex $v_r'$, where $$v_r' = \frac{4}{16}v_r + \frac{2}{16}\sum (\text{midpoint vertices}) + \frac{1}{16}\sum (\text{corner vertices});$$

and
   (ii) for an extraordinary vertex $v_e$, calculating an updated vertex $v_e'$, where $$v_e' = \alpha v_e + \beta \Sigma(\text{edge vertices}) + \gamma \Sigma(\text{face vertices}).$$

4. The method of claim 3, wherein $\alpha=\alpha(N)=(N-3)/N$, where N is the valence of $v_e$.

5. The method of claim 3, wherein $\beta=\beta(N)=2/N^2$, where N is the valence of $v_e$.

6. The method of claim 3, wherein $\gamma=\gamma(N)=1/N^2$, where N is the valence of $v_e$.

7. The method of claim 3, wherein $\alpha+N\beta+N\gamma=1$.

8. The method of claim 1, wherein an iteration of smoothing of step (b) comprises:
   for a vertex $P_n$ on a crease or boundary, calculating $$P_n^{2k+1} = \frac{1}{4}P_n^{2k-1} + \frac{1}{2}P_{n+1}^{2k-1} + \frac{1}{4}P_{n+2}^{2k-1}$$

for the $k^{th}$ iteration.

9. A method for converting an arbitrary mesh to a subdivision surface having an even degree d, the degree having the form d=2m, comprising the steps of:
   (a) subdividing the mesh;
   (b) developing a dual of the subdivided mesh; and
   (c) iteratively smoothing the dual m−1 times, whereby a model of the surface results.

10. The method of claim 9, wherein step (a) comprises the steps of:
    (i) adding a vertex at a midpoint of each edge;
    (ii) adding a vertex at a centroid of each face; and
    (iii) adding edges that connect each centroid with the midpoints of the centroid's surrounding edges.

11. The method of claim 9, wherein the dual of the subdivided mesh comprises:
    (i) vertices at the centroids of the faces of the subdivided mesh; and
    (ii) edges joining the vertices at the centroids of the faces that share a common edge in the subdivided mesh.

12. The method of claim 9, wherein an iteration of smoothing the dual comprises replacing a vertex of the dual with an average of the centroids of four adjacent faces.

13. A computer program product, for use in computer-aided design of surfaces, comprising a computer usable medium having computer readable program code means embodied in said medium for causing a program to execute on a computer that converts an arbitrary mesh to a subdivision surface having an odd degree d, the degree having the form d=2m+1, said computer readable program code means comprising:

- a first computer program code means for causing the computer to subdivide the mesh; and
- a second computer program code means for causing the computer to iteratively smooth said subdivided mesh m times, whereby a model of the surface results.

14. A computer program product, for use in computer-aided design of surfaces, comprising a computer usable medium having computer readable program code means embodied in said medium for causing a program to execute on a computer that converts an arbitrary mesh to a subdivision surface having an even degree d, the degree having the form d=2m, said computer readable program code means comprising:

- a first computer program code means for causing the computer to subdivide the mesh;
- a second computer program code means for causing the computer to develop the dual of said subdivided mesh; and
- a third computer program code means for causing the computer to iteratively smooth said subdivided mesh m−1 times, whereby a model of the surface results.

15. The method of claim 1, wherein the mesh is defined by arbitrary spatial datapoints represented by vertices.

16. The method of claim 1, further comprising the step, prior to step (a), of creating the mesh from arbitrary spatial datapoints represented by vertices.

17. The method of claim 1, wherein the resulting model of the surface represents smoothed arbitrary spatial datapoints, each datapoint being a vertex, by which the mesh is defined.

* * * * *